Figure 1:
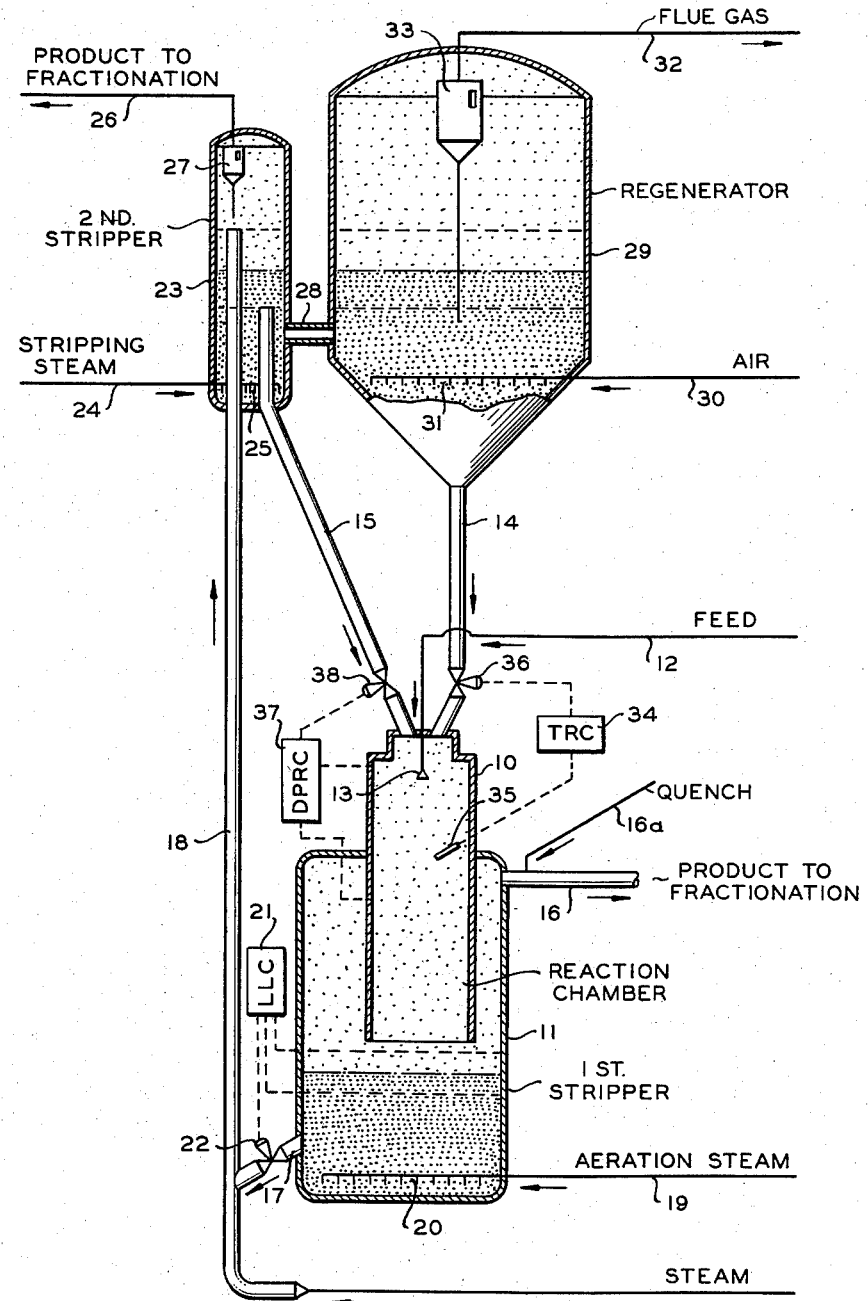

Dec. 20, 1960 K. A. HARPER 2,965,454
FLUIDIZED CONVERSION AND STRIPPING APPARATUS
Filed April 30, 1957 2 Sheets-Sheet 2

INVENTOR.
K. A. HARPER
BY
Hudson & Young
ATTORNEYS

Patent 2,965,454

United States Patent Office

2,965,454
Patented Dec. 20, 1960

2,965,454
FLUIDIZED CONVERSION AND STRIPPING APPARATUS

Kenneth A. Harper, Bartlesville, Okla., assignor to Phillips Petroleum Company, a corporation of Delaware Filed Apr. 30, 1957, Ser. No. 656,099

2 Claims. (Cl. 23—288)

This invention relates to an improved method and apparatus for conducting catalytic reactions in a fluidized solids conversion system. In one aspect, this invention relates to an improved method and apparatus for the conversion of fluid hydrocarbons in the presence of finely-divided catalyst. In another aspect, this invention relates to an improved fluidized catalytic cracking process and apparatus wherein fluid hydrocarbons are contacted with fluidized cracking catalyst and the carbonaceous deposits formed on the catalyst during the conversion reaction subsequently removed in a regeneration step. More specifically, this invention relates to an improved fluidized catalytic cracking process and apparatus of the downflow reactor type.

In fluidized processes, the conversion of the fluid reactants and the regeneration of the contaminated catalyst are accomplished continuously in separate confined reaction and regeneration vessels between and through which the catalyst is continuously passed in series. The mass of catalyst being employed in these processes is maintained in a fluidized condition which can be one of the two general types of fluidized conditions discussed below. The type of fluidization taking place in the reactor, regenerator, and to some extent in the standpipes, is termed dense phase fluidization in which the body of catalyst has the appearance of a boiling liquid. In dense phase fluidization, the body of catalyst is in restricted motion; that is, individual catalyst particles move freely through any part of the bed itself but do not move substantially beyond the confines of the vessel or the catalyst-vapor interface. Dense phase fluidization is created by the flow of gas through a bed of catalyst and a dense phase fluidized bed of catalyst is characterized as a dispersion of gas in a bed of solids. There is relatively little entrainment of individual catalyst particles in the fluidizing gas flowing through the fluidized bed of particles. The second type of fluidization, which takes place in the risers, is termed light phase or dilute phase fluidization. In this type fluidization, the catalyst and vapor are mixed more homogeneously than in dense phase fluidization and the individual catalyst particles move in the same direction and at nearly the same linear velocity as the vapor stream. Thus, there is no bed and, therefore, there is no interface between a bed of the catalyst and vapor and the catalyst-fluid mixture fills the confining vessel completely.

One of the major difficulties encountered in the conventional dense phase fluidized catalytic cracking process is the heavy deposition of carbonaceous material and coke on the surfaces of the catalyst and the various surfaces of the reaction equipment when reactant streams containing some low refractory components are subjected to catalytic conversion. The contamination of the cracking catalyst with the difficultly removable carbonaceous deposits has detrimental effects on the selectivity of the catalyst as well as on the yield of motor fuel boiling range products produced. The deposition of carbonaceous material and coke on the surfaces of the equipment necessitates frequent shut-down of the equipment for the removal of such deposits. Frequent shut-down of the unit results in very uneconomical operation not only because production time is lost but also because the enormous size of the equipment makes the cleaning operation expensive.

I have now discovered that hydrocarbon conversion reactions can be carried out in an improved manner with a higher yield of the desired motor fuel boiling range products and a reduction in the deposition of carbonaceous material by conducting said hydrocarbon conversion reactions in a downflow reaction zone in which light phase fluidization of the catalyst particles is maintained. My invention is based on the discovery that the least refractory components of a charge stream are the least vaporizable or heavier portion of the charge stream and that these least refractory components can receive a desired short catalyst contact time in a reaction zone in which light phase fluidization and concurrent flow are established, because the heavier least refractory components can pass through the reaction zone at a faster rate than the lighter more refractory components of the charge.

An object of this invention is to provide an improved method and apparatus for conducting reactions in a fluidized solids conversion system. Another object of this invention is to provide an improved catalytic cracking process and apparatus wherein improved yield of motor fuel boiling range products is obtained. Another object of this invention is to provide an improved fluidized catalytic cracking process and apparatus wherein there is reduced deposition of carbonaceous materials. Another object of this invention is to provide an improved fluid catalytic cracking process and apparatus wherein the various components of the feed stream are contacted with the catalyst for various contact times determined by the degree of refractoriness of the various components of the feed. Another object of this invention is to provide an improved catalytic cracking process and apparatus wherein the reactions are conducted in a downward flow manner in a light phase fluidization zone.

Other aspects, objects and advantages of the invention are apparent from a consideration of the accompanying disclosure, drawings and the appended claims.

In accordance with this invention, there is provided a fluidized conversion process and apparatus for performing said process wherein a reactant containing at least some liquid phase is contacted under reaction conversion conditions with a contact material maintained in a condition of light phase fluidization.

More specifically, there is provided a fluidized conversion process, and apparatus for performing said process, wherein a vaporizable liquid or liquid-vapor reactant is contacted under reaction conversion conditions in a concurrent manner with a downwardly moving contact material maintained in a condition of light phase fluidization.

Still more specifically, this invention provides a fluidized catalytic cracking process, and apparatus for performing said process, wherein the different components of the feed stream are contacted with the catalyst for contact times in proportion to their refractoriness, said process comprising introducing a vaporizable liquid or liquid-vapor feed stream into the upper portion of a confined reaction zone maintained under catalytic cracking conditions and passing said feed stream downwardly concurrently in contact with a descending mass of catalyst maintained in a light phase fluidized state, passing the resulting reaction mass downwardly into the upper portion of a first vapor-solids separation zone maintained in a dense phase fluidized state by an inert gaseous stream introduced into the lower portion of said first vapor-solids separation zone, removing the vaporous product stream from the catalyst particles in the upper portion of said first vapor-solids separation zone, discharging the spent catalyst from the lower portion of said first vapor-solids separation zone, passing the discharged spent catalyst upwardly in a fluidized lift to an elevated second vapor-solids separation zone by the introduction of an inert gas in the stream of discharged spent catalyst from said first vapor-solids separation zone, removing the occluded vaporous product and inert gas from said second vapor-solids separation zone and flowing the stripped catalyst into a regeneration zone, introducing a gaseous reactivating stream into the lower portion of said regeneration zone and reactivating said spent catalyst, and continuously passing the resulting regenerated catalyst from the lower portion of said regeneration zone into the upper reaction zone.

A particular feature of this invention is the recycle, as desired, of stripped spent catalyst from the second vapor-solids separation zone into the upper portion of the reaction zone at a rate determined by the pressure drop across a portion of the reaction zone in order to control the catalyst concentration in the reaction zone. The rate of addition of regenerated catalyst into the reaction zone is varied to control the temperature in said reaction zone. Thus, as the pressure drop across the reaction zone decreases, the addition of spent catalyst from said second vapor-solids separation zone is increased in order to increase the amount of catalyst in the reaction zone. Similarly, if the pressure drop across the reaction zone increases, indicating that the proportion of catalyst to vapor in the reaction zone has increased so that the amount of catalyst in the reaction zone is too great, the addition of spent catalyst from the second vapor-solids separation zone is decreased. Conversion of the feed is controlled by the temperature and the catalyst concentration, or the catalyst to oil ratio.

In one embodiment of this invention, the reaction zone is defined by a vertically disposed elongated cylindrical chamber having an enclosed upper end and an open lower end which extends into the first vapor-solids separation zone defined by a verticaly disposed elongated cylindrical chamber having a diameter greater than the diameter of the chamber containing said reaction zone and having enclosed ends. Preferably, the extension of the reaction chamber into the vapor-solids separation chamber terminates at the uppermost level of a dense phase fluidized catalyst bed maintained in the vapor-solids separation chamber. The flow of catalyst from the light phase fluidization zone in the reaction chamber into the dense phase fluidization zone in the vapor-solids separation chamber is unrestricted. Thus, the downward flow of light phase fluidized catalyst in the reaction chamber is balanced against the pressure existing in the first vapor-solids separation chamber wherein dense phase fluidization of the catalyst is maintained. Reactant inlet means and regenerated catalyst inlet means are provided in the upper closed end of the reaction chamber.

The separation of vaporous conversion products from the catalyst particles is effected in a solids disengaging zone disposed above the uppermost level of the bed of dense phase fluidized catalyst in the vapor-solids separation chamber. This solids disengaging zone is annular in shape in the preferred embodiment since the reaction chamber extends through the top of the vapor-solids separation chamber to a point adjacent the uppermost level of the dense phase fluidized catalyst bed in the vapor-solids separation chamber. However, it is also included within the scope of this invention that the reaction chamber be attached in open communication to the top of the first vapor-solids separation chamber, wherein there would be no extension of the reaction chamber into the vapor-solids separation chamber. A quench spray 16a may be used in conduit 16 to prevent further cracking of the effluent in line 16.

In one aspect, this invention includes a plurality of cooperating steps so coordinated as to provide a continuous process wherein a hydrocarbon reactant is contacted concurrently with catalyst particles in a downwardly moving mass of light phase fluidized particles which pass into a first vapor-solids separation zone containing a dense phase fluidized bed of catalyst particles. The vaporous reaction products are separated from the spent catalyst in the vapor-solids separation zone and the spent catalyst transported first to a second vapor-solids separation zone and then to a regeneration zone where the catalyst is reactivated and continuously returned to the reaction zone. Preferably, the reaction zone and the first vapor-solids separation zone are maintained in a substantial vertical alignment with the vapor-solids separation zone as the lowermost zone. Also, preferably, the regeneration zone is disposed above the reaction zone in substantial vertical alignment therewith at a sufficient elevation that the pressure required in the reaction zone is developed as hydrostatic by the column of catalyst particles above the reaction zone. The second vapor-solids separation zone is maintained adjacent the regeneration zone above the reaction zone and first vapor-solids separation zone with the uppermost level of the dense phase fluidized bed of catalyst in the first vapor-solids stripping zone and in said regeneration zone being approximately the same in each zone. The spent catalyst discharged from the first vapor-solids separation zone is transported to the elevated second vapor-solids separation zone by the introduction of steam or other substantially inert gaseous medium into the conduit joining these two separation zones under sufficient pressure to develop a gas lift. The pressure in the regeneration zone is the lowest of any pressure in the system whereas the highest pressure in the system is in the reaction zone.

Figure 2:
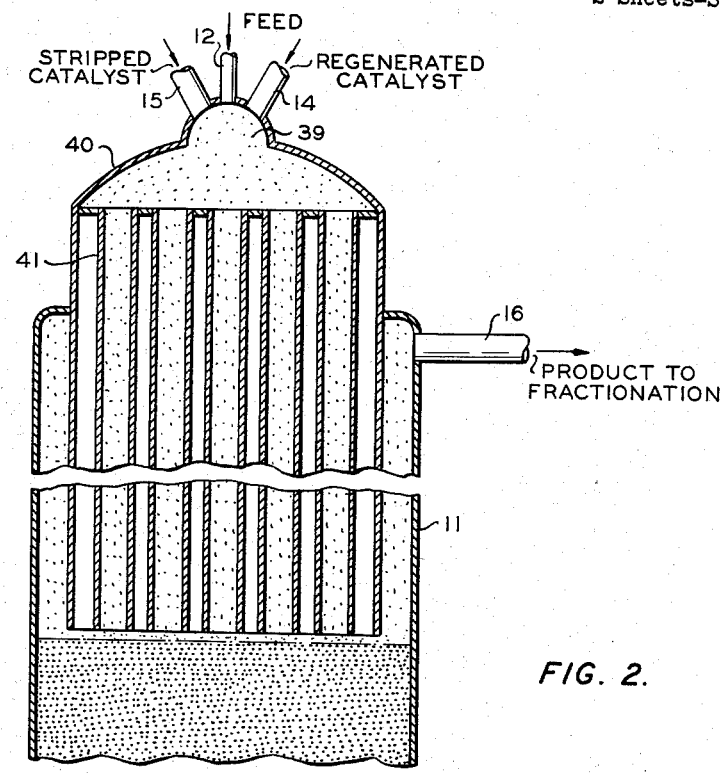
Figure 3:
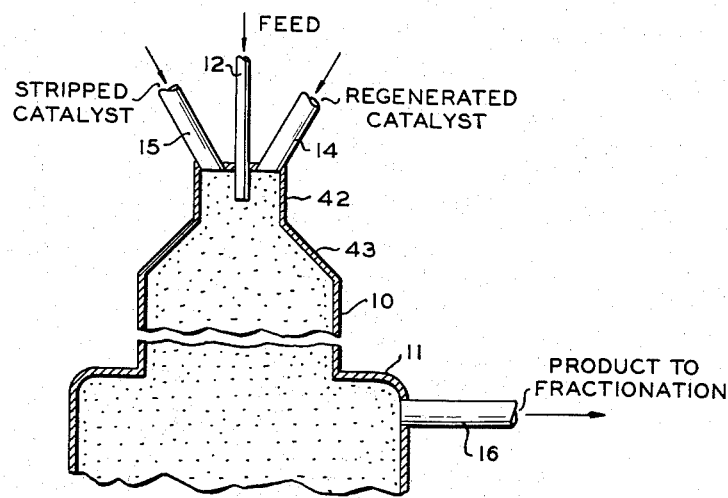

For a better understanding of the invention, reference is now made to the accompanying diagrammatic drawings. Figure 1 is a diagrammatic elevational view showing a complete fluid catalytic cracking system of this invention. Figure 2 is a diagrammatic elevational view of a portion of the reaction and first vapor-solids separation chambers showing one construction and arrangement of the reaction chamber and a construction of the catalyst-reactant inlet section of the reaction chamber. Figure 3 is an elevational sectional view of a portion of the reaction and first vapor-solids separation chamber showing another construction and arrangement of the reaction chamber and another construction of the catalyst-reactant inlet section of the reaction chamber.

Referring to Figure 1, there is shown a vertically disposed elongated cylindrical reaction chamber 10 arranged with its lower end extending into a vertically disposed first stripper or vapor-solids separation chamber 11 of circular cross-section having a diameter larger than the diameter of reaction chamber 10. The upper end of reaction chamber 10 is provided with feed inlet conduit 12 through which hydrocarbon reactant is supplied to the upper portion of reaction chamber 10 and distributed throughout the reaction zone by distributing means 13, regenerated catalyst conduit 14 through which regenerated catalyst flows by gravity into the upper portion of reaction chamber 10, and stripped spent catalyst conduit 15 through which stripped spent catalyst is supplied to the upper portion of reaction chamber 10. The lower end of reaction chamber 10 is completely open and free from any restriction to the passage of catalyst and reactants from reaction chamber 10 into first stripper 11.

First stripper 11 is provided with an outlet conduit 16 located adjacent the top of first stripper 11 and through which the vaporous reaction products are removed and passed to the fractionation system (not shown). A catalyst discharge conduit 17 is located in the lower portion of first stripper 11 and provides for flow of catalyst from first stripper 11 into vertical riser 18. Aeration steam is introduced into the lower portion of first stripper 11 by conduit 19 and distributed across the horizontal cross-sectional area thereof adjacent the lower end by distributing means 20 to maintain the catalyst in the lower portion of first stripper 11 in a state of dense phase fluidization. The uppermost level of the bed of dense phase fluidized catalyst in a first stripper 11 is controlled by liquid level controller 21 which regulates the position of valve 22 in catalyst withdrawal conduit 17. Liquid level controller 21 is adjusted so that the highest level of dense phase fluidized catalyst is just below the lower open end of reaction chamber 10 and the lowest level is always at some point above the outlet of catalyst withdrawal conduit 17.

The spent catalyst withdrawn from first stripper 11 through catalyst withdrawal conduit 17 is transported through vertical riser 18 to second stripper or vapor-solids separation chamber 23 by the introduction of steam or other inert gaseous medium into the lower end of vertical riser 18. In second stripper 23, the occluded hydrocarbon conversion products are stripped from the catalyst by the introduction of stripping steam through conduit 24 and distributing means 25 located adjacent the bottom of second stripper 23. The stripped hydrocarbon conversion products and stripping steam are removed from the upper portion of second stripper 23 through conduit 26. Catalyst separator 27 of the centrifugal or cyclone type is positioned within the upper portion of second stripper 23 for removing and recovering entrained catalyst particles from the outgoing gaseous stream passing through conduit 26. Conduit 28 in the lower portion of second stripper 23 provides for passage of stripped spent catalyst from second stripper 23 into regenerator 29. Stripped catalyst conduit 15 for recycling spent stripped catalyst from second stripper 23 into reaction chamber 10 is positioned in the lower end of second stripper 23 with its inlet end extended into second stripper 23 in a vertical manner for a distance intermediate the outlet end of vertical riser 18 extended into second stripper 23 and the outlet of conduit 28.

In regenerator 29, which is located at a substantial elevation above reaction chamber 10 and first stripper 11 and adjacent second stripper 23, the stripped spent catalyst flowing from second stripper 23 through conduit 28 into regenerator 29 is contacted with reactivating gas, such as air, introduced by conduit 30 into the lower portion of regenerator 29 and distributed throughout the catalyst by distributing means 31. The gaseous products of regeneration are removed from the upper portion of regenerator 29 through conduit 32. Catalyst separator 33 of the centrifugal or cyclone type is positioned within the upper portion of regenerator 29 for removing and recovering entrained catalyst particles from the outgoing regenerator gaseous stream passing conduit 32. The regenerated catalyst flows by gravity through regenerated catalyst conduit 14 into reaction chamber 10. The flow of regenerated catalyst into reaction chamber 10 is regulated by temperature recorder controller 34 which detects the temperature in reaction chamber 10 by thermocouple 35 located within the reaction chamber 10 and regulates the position of valve 36 located in the lower end of regenerated catalyst conduit 14.

In operation of the embodiment shown in Figure 1, dense phase regenerated catalyst flows by gravity through regenerator catalyst conduit 14 into reaction chamber 10 where light phase fluidization of the catalyst is developed. Hydrocarbon reactant entering through conduit 12 contacts the downwardly moving mass of light phase fluidized catalyst in a concurrent manner and then out the open end of reaction chamber 10 into first stripper 11. The hydrocarbon feed stream is ordinarily supplied to reaction chamber 10 at an elevated temperature sufficient to cause at least a portion of the hydrocarbon reactant to be in the vapor state. In the light phase fluidization zone of reaction chamber 10, the least refractory components of the hydrocarbon reactant, being the liquid components of the feed, flow through the vapor and catalyst particles in the light phase fluidized state and thereby contact the catalyst for a shorter time than the lighter and more refractory vapor portion of the reactant stream. The pressure required in reaction chamber 10, ordinarily about 5 p.s.i.g., is the hydrostatic pressure of the column of catalyst particles in regenerated catalyst conduit 14. The reaction temperature of 900° F. in reaction chamber 10 is maintained by the hot regenerated catalyst which has a temperature of approximately 1100° F. The reaction temperature of 950° F. in reaction chamber 10 is controlled by temperature recorder controller 34 which regulates the flow of hot regenerated catalyst through conduit 14 into reaction chamber 10. The catalyst residence time in reaction chamber 10 is maintained by the recycle of stripped spent catalyst from second stripper 23 through conduit 15 into the top of reaction chamber 10. The flow of this spent stripped catalyst is regulated by pressure differential recorder controller 37 which senses the pressure drop across a portion of reaction chamber 10 and regulates the position of motor valve 38 in stripped spent catalyst conduit 15. Thus, if the residence time of a catalyst in the reaction zone becomes too short, there is a high rate of flow of catalyst through the reaction zone, and a correspondingly high pressure drop developed across the reaction zone, so that differential pressure recorder 37 operates to close down valve 38 and reduce the flow of spent stripped catalyst into reaction chamber 10. Similarly, if the catalyst residence time in the reaction zone is too long, as is detected by a low pressure drop across the reaction zone, valve 38 in conduit 15 is opened to increase the flow of stripped spent catalyst into the reaction zone.

In the first stripper 11, the downward flow of light phase fluidized catalyst and reactants is balanced against the pressure of the dense phase fluidized catalyst bed maintained in the lower portion of first stripper 11. Some of the high boiling, least refractory components of the feed stream entering reaction chamber 10 through conduit 12 pass through the reaction zone within reaction chamber 10 without being vaporized and fall into the bed of dense phase catalyst in the bottom of first stripper 11. With respect to these components of the feed, the conversion reactions are completed in the dense phase fluidized bed of catalyst in stripper 11. Since the temperature of the dense phase fluidized catalyst in first stripper 11 is substantially below the temperature of the catalyst in the light phase fluidization zone of reaction chamber 10, the dense phase fluidized bed of catalyst in first stripper 11 provides for the lay-down of coke on the catalyst particles under less severe conditions with less detrimental effect to the catalyst. The vaporous products of the hydrocarbon conversion reactions separate from the catalyst particles in the upper portion of first stripper 11 above the uppermost level of the dense phase fluidized bed of catalyst in the lower portion of first stripper 11 and are withdrawn from the system through conduit 16 for fractionation into the desired products. In this embodiment, the disengaging zone above the uppermost level of the dense phase fluidized bed of catalyst is annular in horizontal cross-section and, at least adjacent the uppermost surface of this dense phase fluidized bed, the catalyst is in a state of light phase fluidization. The injection of aeration steam through conduit 19 into the bottom of first stripper 11 maintains the catalyst in the lower portion of first stripper in the dense phase fluidized condition. In addition, this steam also strips occluded hydrocarbon conversion products from the surface of the catalyst and thereby improves the recovery of the hydrocarbon conversion products from the catalyst. The pressure in first stripper 11 is slightly less than the 5 p.s.i.g. in reaction chamber 10 and is also developed by the injection of steam into the bottom of first stripper 11 through conduit 19. Liquid level controller 21 maintains the uppermost level of the dense phase of fluidized catalyst in the bottom of first stripper 11 below the open end of reaction chamber 10.

The spent catalyst is withdrawn from the bottom of first stripper 11 through catalyst withdrawal conduit 17 and transported to second stripper 23 through vertical riser 18 by the addition of steam or other inert stripping gas into the bottom of vertical riser 18. The catalyst in vertical riser 18 is maintained in a substantially dilute phase condition of fluidization. In second stripper 23, the remaining occluded and absorbed reaction products are stripped from the catalyst particles in a dense phase fluidized bed maintained by the injection of stripping steam or other gaseous stripping medium into the lower portion of second stripper 23. The uppermost level of the dense phase fluidized bed of catalyst in second stripper 23 is maintained substantially level with the uppermost level of the dense phase fluidized bed of catalyst in regenerator 29 by the open communication of conduit 28 between second stripper 23 and regenerator 29. As previously noted, some of the stripped spent catalyst is recycled from second stripper 23 in a state of dense phase fluidization to reaction chamber 10 by means of conduit 15 for regulation of the catalyst residence time in reaction chamber 10. Above the uppermost level of the dense phase fluidized bed of catalyst in second stripper 23 the catalyst is maintained in a light phase fluidization state adjacent the uppermost surface of the dense phase fluidized bed of catalyst and the stripped vapor products are removed to products fractionation through cyclone separator 27 by conduit 26.

In regenerator 29, the stripped spent catalyst is contacted with air or other reactivation gas countercurrently in a dense phase fluidized bed of catalyst in order to regenerate the activity of the catalyst. In addition to accomplishing regeneration of the catalyst, the air injected through conduit 30 into the bottom of regenerator 29 also maintains the catalyst in a state of dense phase fluidization. Above the uppermost level of the dense phase fluidized bed of catalyst in regenerator 29, the catalyst is in a state of light phase fluidization with higher concentrations of catalyst present near the uppermost surface of the bed than are found at the top of regenerator 29. The discharge of regeneration gases from generator 29 is through cyclone separator 33 and conduit 32. The pressure in regenerator 29 is slightly above atmospheric pressure, which is the lowest pressure in the system.

In the embodiment of Figure 2, a plurality of vertical reaction tubes are used in place of the single reaction chamber disclosed in the embodiment of Figure 1. Only the construction of this novel reaction chamber and the upper portion of the first stripper is shown in Figure 2, and like elements of Figure 1 are identified by the same reference characters in Figure 2. Figure 2 also discloses a novel arrangement of the outlet ends of regenerated catalyst conduit 14, feed conduit 12 and spent stripped catalyst conduit 15 in spherical mixing chamber 39 which is in open communication with header 40. Vertical reaction tubes 41 are attached at their upper end to header 40 in open communication therewith and are arranged so as to be disposed in the upper portion of first stripper 11 with their lower open ends adjacent the uppermost surface of the dense phase fluidized bed of catalyst maintained in the lower portion of first stripper 11. The catalyst is maintained in the reaction tubes 41 in a light phase fluidization state as was maintained in reaction chamber 10 of Figure 1. Preferably, substantial lengths of reaction tubes 41 are disposed within first stripper 11 so that improved heat transfer and temperature regulation is obtained within reaction tubes 41 by the flow of light phase fluidized solids and reaction products in heat transfer relationship with the reaction tubes 41 in the solids disengaging zone in first stripper 11 above the uppermost level of the dense phase fluidized bed of catalyst maintained therein.

In Figure 3 is shown another embodiment of the invention in which the lower end of reaction chamber 10 terminates at the top of first stripper 11, instead of being extended into the solids disengaging zone within stripper 11, and there is also provided another novel arrangement of the outlet ends of regenerated catalyst conduit 14, feed inlet conduit 12 and spent stripped catalyst conduit 15. In this figure, only a portion of reaction chamber 10 and first stripper 11 is shown; the same elements in Figure 1 being identified by the same reference characters in Figure 3. In this embodiment, reaction chamber 10 is very similar to the reaction chamber of Figure 1 except that the lower open end of reaction chamber 10 terminates at the upper end of first stripper 11 so that there is unrestricted flow of catalyst in a state of light phase fluidization into the upper portion of first stripper 11. The feed inlet section of reaction chamber 10, as shown in this embodiment, is composed of a short cylindrical section 42 attached to the upper end of reaction chamber 10 by a conical skirt 43 with the outlet end of feed conduit 12 extending axially into circular section 42 to a point adjacent the juncture of circular section 42 with outwardly flared skirt 43. The outlet ends of regenerated catalyst conduit 14 and spent stripped catalyst conduit 15 are attached opposite each other at an oblique angle with respect to feed inlet conduit 12 on the opposite sides of feed inlet conduit 12 to the closed end of circular section 42. This construction permits an admixing of the regenerated catalyst entering through conduit 14 with the spent stripped catalyst entering through conduit 15 in the circular section 42 and then the contact of this admixed catalyst with the hydrocarbon feed being discharged from conduit 12 into the outwardly flared skirt 43. This feed inlet construction is not limited to use with a reaction chamber not extending into first stripper 11, as shown in Figure 3, but this same feed inlet section can also be employed in the embodiment of Figure 1 where reaction chamber 10 extends into first stripper 11.

The catalyst employed in the process of this invention may be of the type conventionally used in fluid catalyst processes, for example, a catalyst consisting predominantly of silica and one of more metal oxides such as alumina, zirconia, magnesia, or the like. Other catalysts, including natural or treated clays, bauxite, activated alumina, or synthetic composites of certain metallic oxides may also be used. The catalyst is normally employed in the form of a finely-divided powder having a particle size in the range of 3–100 mesh; however, larger size particles can also be employed provided the size of these particles, in relation to the average density of the particles, is not sufficiently great to hinder ready transportation of the particles by gas lift.

The process and apparatus of this invention is particularly advantageous for the treating of hydrocarbon streams such as reduced crudes, gas oils, etc. in the presence of a catalyst; however, the invention is not limited in its operation to any one conversion process such as catalytic cracking disclosed in the description of the drawings. For example, this invention can be used to advantage to effect hydrogenation, dehydrogenation, reforming, aromatization, polymerization, and the like, of various hydrocarbon charge streams in the presence of a suitable catalyst. The conditions in the reaction zone in each of these processes will be those conventionally used in operations of that particular type and well known to those skilled in the art. With respect to catalytic cracking processes, these process conditions generally comprise a temperature in the reaction zone in the range of 870–1050° F., a temperature in the regeneration zone in the range of 1025–1170° F., a catalyst to oil ratio in the reaction zone in the range of from about 1:1 to 20:1, a catalyst residence time in the reaction zone in the range from about 10 seconds to about 10 minutes, a weight space velocity in the reaction zone in the range of from about 1 to about 20 pounds of oil per hour per pound of catalyst, a pressure in the reaction zone in the range of 3 to 13 p.s.i.g. and a pressure in the regenerator in the range of 0 to 10 p.s.i.g.

*Specific example*

Charge material 12:
 Topped Western Kansas crude, API @ 60/60° F. _____ 17.5
 Preheat temperature, ° F. _____ 800
 Barrels per hour _____ 100
Catalyst 14:
 Synthetic silica-alumina, Tyler mesh _____ 3–100
 Temperature, ° F. _____ 1125
 Tons per hour _____ 100
Recycle catalyst 15:
 Temperature, ° F. _____ 940
 Tons per hour _____ 200
Reaction zone 10: [1]
 Temperature, ° F. _____ 950
 Pressure, p.s.i.g. _____ 5
 Regen. cat./feed wt. ratio _____ 6:1
 Total cat./feed wt. ratio _____ 18:1
Regeneration zone 29:
 Temperature, ° F. _____ 1125
 Pressure, p.s.i.g. _____ 1

[1] 50 percent conversion is effected: the catalyst contains 2.0 weight percent coke; and the regenerated catalyst contains 0.4 weight percent coke.

By operating in accordance with my specific example, as compared with conventional processing in known prior art systems, the lighter portions of the feed material which are known to be more difficultly cracked are in contact with the cracking catalyst in the cracking zone for a longer time than the heavier portions of the feed material which are known to be more easily cracked. In this manner, the lighter portions of the charge are subjected to the desired higher level of conversion to produce desired products and the heavier materials are concomitantly subjected to the desired lower level of conversion to produce the desired products, resulting in less coke and gas formation and in increased desired products formation.

Reasonable variation and modification are possible within the scope of the foregoing disclosure, drawings and the appended claims to the invention, the essence of which is that there have been provided a method and apparatus for the conversion of reactants in a fluidized conversion system wherein a reactant containing at least some liquid phase is contacted under reaction conversion conditions in a concurrent manner with a downwardly moving mass of contact material maintained in a light phase fluidized state.

I claim:

1. In combination, a vertically disposed, elongated reaction chamber closed at the upper end thereof, a vapor-solids separation vessel having a horizontal cross-sectional area greater than that of said reaction chamber having closed top and bottom ends, said reaction chamber comprising a plurality of vertically disposed tubes extending down to an intermediate level in said lower vapor-solids separation vessel from a catalyst-reactant inlet zone, a fluid reactant inlet means located in the upper closed end of said reaction chamber for supplying reactant to said reaction chamber, a separate catalyst inlet means located in the upper closed end of said reaction chamber for supplying catalyst to said reaction chamber, an inert gaseous stream inlet means located adjacent the bottom closed end of said vapor-solids separation vessel for maintaining a dense phase fluidized bed of catalyst in the lower portion of said vapor-solids separation vessel, a vaporous product withdrawal means located in the upper end of said vapor-solids separation section for discharge of separated vaporous conversion products, and a catalyst withdrawal outlet means located in the lower end of said vapor-solids separation section for withdrawal of spent catalyst from said vapor-solids separation vessel.

2. In combination, a vertically disposed elongated cylindrical reaction chamber having open ends, a vertically disposed elongated cylindrical vapor-solids separation vessel having a diameter larger than the diameter of said reaction chamber and having enclosed ends, said reaction chamber being disposed above and projecting into said vapor-solids separation vessel in vertical alignment therewith and being in open communication therewith, a vertically disposed elongated cylindrical catalyst-reactant inlet section which is closed at its upper end and attached at its lower open end with the upper end of said reaction chamber, an axially disposed reactant inlet means located in the upper closed end of said catalyst-reactant inlet section and extending therein in open communication with said catalyst-reactant inlet section, a first separate catalyst inlet means located in the closed end of said catalyst reactant inlet section in open communication with said catalyst-reactant section, a second separate catalyst inlet means located in the closed end of said catalyst-reactant inlet section in open communication with said catalyst-reactant means, an inert gaseous stream inlet means located adjacent the closed end of said vapor-solids separation section for maintaining a dense phase fluidized bed of catalyst in the lower portion of said vapor-solids separation section, a vaporous product withdrawal means located in the upper end of said vapor-solids separation section for discharge of vaporous conversion products separated in said vapor-solids separation vessel, a catalyst withdrawal outlet located in the lower end of said vapor-solids separation vessel for withdrawal of spent catalyst from said vapor-solids separation vessel for regeneration, a temperature sensing means located in said reaction chamber, means for controlling the flow of catalyst into said catalyst-reactant inlet section through said first catalyst inlet means in response to said temperature sensing means, pressure differential sensing means located in said reaction section to measure a pressure drop across a portion of said reaction section, means for controlling the flow of catalyst into said catalyst-reactant inlet section through said second catalyst inlet means in response to said pressure differential sensing means.

References Cited in the file of this patent

UNITED STATES PATENTS

| | | |
|---|---|---|
| 2,249,924 | Wilson | July 22, 1941 |
| 2,256,969 | Barr | Sept. 23, 1941 |
| 2,319,199 | Benedict | May 18, 1943 |
| 2,348,418 | Roesch et al. | May 9, 1944 |
| 2,379,027 | Monro | June 26, 1945 |
| 2,436,464 | Van Dornick | Feb. 24, 1948 |
| 2,450,753 | Guyer | Oct. 5, 1948 |
| 2,490,336 | Crowley | Dec. 6, 1949 |
| 2,670,322 | Krebs et al. | Feb. 23, 1954 |
| 2,760,843 | Kollgaard | Aug. 28, 1956 |
| 2,775,547 | Ardern et al. | Dec. 25, 1956 |